(12) United States Patent
Krauskopf

(10) Patent No.: US 7,350,429 B2
(45) Date of Patent: Apr. 1, 2008

(54) CUSTOM VEHICULAR MONITORING DEVICE

(76) Inventor: Brett J. Krauskopf, 5474 Yellow Birch Way, Indianapolis, IN (US) 46254

( * ) Notice: Subject to any disclaimer, the term of this patent is extended or adjusted under 35 U.S.C. 154(b) by 164 days.

(21) Appl. No.: 10/999,040

(22) Filed: Nov. 29, 2004

(65) Prior Publication Data

US 2006/0112775 A1    Jun. 1, 2006

(51) Int. Cl.
    *G01D 7/02* (2006.01)
(52) U.S. Cl. .................................... 73/866.3
(58) Field of Classification Search ........... 73/866.3, 73/291, 714; 374/144–146, 21; 116/284–305; D10/60, 74, 94; D11/2, 3, 86, 112, 113, 163, D11/164, 184
See application file for complete search history.

(56) References Cited

U.S. PATENT DOCUMENTS

| D65,206 | S | * | 7/1924 | Wirth | D10/60 |
|---|---|---|---|---|---|
| D126,076 | S | * | 3/1941 | Kimes | D10/54 |
| D157,653 | S | * | 3/1950 | Barkules et al. | D10/54 |
| D220,050 | S | * | 3/1971 | Yannich | D10/124 |
| D248,931 | S | * | 8/1978 | Nakamura | D10/125 |
| 4,254,375 | A | * | 3/1981 | Matsuoka | 324/115 |
| 4,284,029 | A | * | 8/1981 | Roberts | 116/300 |
| 4,638,666 | A | * | 1/1987 | Wong et al. | 73/431 |
| 4,689,624 | A |  | 8/1987 | Kago et al. |  |
| 5,257,167 | A | * | 10/1993 | Clem | 362/27 |
| 5,437,185 | A |  | 8/1995 | Panzica |  |
| 5,969,224 | A |  | 10/1999 | Ebara et al. |  |
| 6,121,890 | A | * | 9/2000 | Tetreault | 340/815.53 |
| 6,640,656 | B2 | * | 11/2003 | Hamilton et al. | 73/866.3 |
| 6,655,209 | B2 | * | 12/2003 | Wada et al. | 73/491 |
| 6,708,115 | B1 |  | 3/2004 | Nagasaka et al. |  |
| 6,854,350 | B2 | * | 2/2005 | Ayres | 73/866.3 |

OTHER PUBLICATIONS

Ultimatecarpage.com, Comment written Mar. 8, 2003.*
Taylor, "How to Spend It: Summer swaying", FT.comSearch, Jul. 2002.*

* cited by examiner

*Primary Examiner*—Robert Raevis
(74) *Attorney, Agent, or Firm*—Krieg DeVault LLP

(57) ABSTRACT

The present invention discloses a method and system for providing custom vehicular monitoring gauges for individuals. The custom vehicular monitoring gauges include a display face having an upper show surface and a lower surface. A sensor scale and a display area are located on the upper show surface of the display face. A predetermined graphic design is located on the display area. The predetermined graphic design comprises a plurality of gems set in a predefined pattern to form the predetermined graphic design. The sensor scale may also comprise a plurality of gems set in a predefined pattern to form the sensor scale.

8 Claims, 3 Drawing Sheets

CUSTOM VEHICULAR MONITORING DEVICE

BACKGROUND OF THE INVENTION

1. Technical Field

The present invention relates generally to vehicular monitoring systems, and more particularly, to a custom vehicular monitoring system for individuals desiring custom vehicular gauges.

2. Related Art

Over the past several years, there has been a dramatic resurgence in custom automobile and motorcycle design as well as in custom accessories for automobiles and motorcycles in particular. Several recently introduced television shows that run on various networks are exclusively dedicated to the custom design of automobiles and motorcycles. Many enthusiasts spend thousands of dollars customizing their automobile or motorcycle and take great pride in the fact that their vehicle has been customized. In fact, some enthusiasts prefer every component of their automobile or motorcycle to be customized in some way or another to distinguish their vehicle from those owned by others.

Conventional vehicle gauges or monitoring devices include a display face that is surrounded by a casing. The display face may be manufactured from metal or plastic and is typically painted one face color, such as white or black. The gauges also include a sensor scale that is either painted on the display or stuck on the display face in the form of stickers. A needle-like indicator sticking through an aperture in the display face is typically used to indicate the level or status of something being monitored by the gauge. The indicator may be manufactured from plastic or metal and may take various shapes. Other than possibly making the casing out of chrome or having some other type of highly polished finish, the look and feel of vehicular monitoring gauges has somewhat remained constant for decades. Typically, a consumer may only choose from one or two types of gauges for any given vehicle, which leaves few options available for customization.

As such, a need exists for a customized vehicular monitoring device that gives custom vehicle enthusiasts the ability to custom design a vehicular monitoring device for their specific vehicle.

SUMMARY

A vehicular monitoring device is disclosed that may be custom designed by an owner of a respective vehicle. One embodiment of the present invention discloses a display face for a vehicular monitoring device. The display face may include an upper show surface and a lower surface. A sensor scale and a display area may be located or set in the upper show surface of the display face. A custom graphic design may be located or set in the display area. The custom graphic design comprises a design that is created or formed by a plurality of gems that are set in a predefined pattern to form the custom graphic design. The predefined pattern may be provided, selected or created by the owner of the vehicle. The display allows vehicle owners to customize their vehicular gauges in a variety of individualized styles.

As set forth above, the predetermined graphic design may be provided, selected or created by the owner of the vehicle. Based on the owner's decision, a plurality of gems is selected to create the graphic design. The gems may be selected based on size, color, or style of gem to create the custom graphic design. In some embodiments, the upper show surface of the display face comprises a layer of precious metal. In order to create the custom graphic design, a plurality of gem settings may be formed in the layer of precious metal substantially in the form of the custom graphic design. Once the settings have been formed, the gems may be fixed in place in the settings, thereby creating the custom graphic design on the display face.

Another embodiment of the present invention discloses a vehicular monitoring device. The vehicular monitoring device includes a casing that encompasses a display face and at least a portion of a drive mechanism. The display face may include an upper show surface that includes a plurality of gems that have been set in the upper show surface. The gems are set in the upper show surface in a predefined pattern to create a custom graphic image. For example, red rubies may be set in the shape of a flame on the display face of the vehicular monitoring device.

In yet another embodiment of the present invention, the display face of the vehicular monitoring device may include at least one recess or aperture that may be formed generally in the shape of the custom graphic design. The gems may be set in a support structure that has been formed in the shape of the custom graphic design. The support structure may be secured in the recess or aperture of the display face. As such, in this embodiment, the gems are set in the support structure which is in turn, set or secured in the display face of the vehicular monitoring device.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
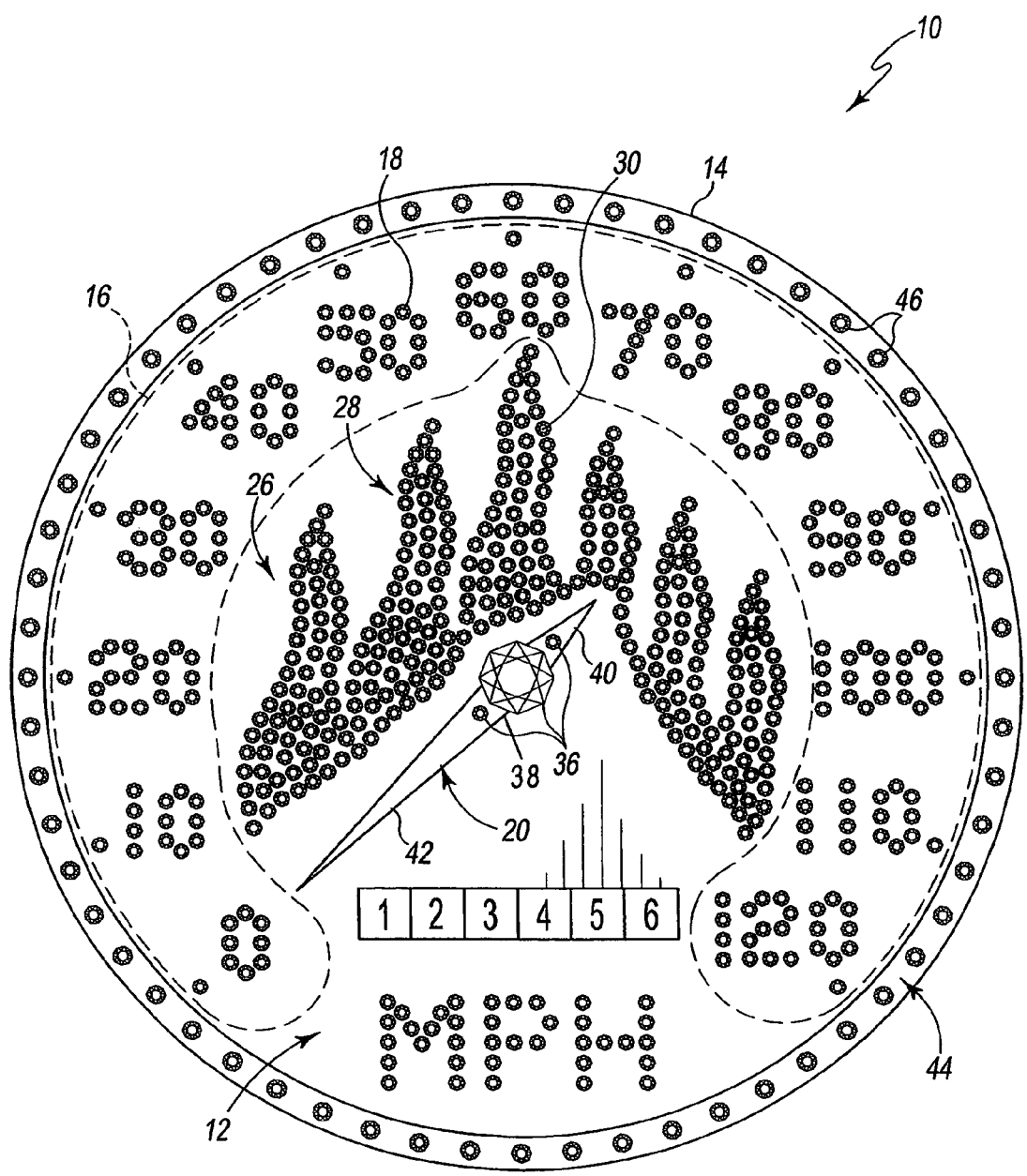
FIG. 1 is a front view of a vehicular monitoring device.

Referring to FIG. 1, a vehicular monitoring device 10 is illustrated that includes a display face 12. The vehicular monitoring device 10 may also include a casing 14 that encompasses, houses or encases the display face 12. Although not depicted, the display face 12 may be covered by a transparent (e.g.—glass or plastic) cover panel that may be connected or secured with the casing 14 so that elements do not make contact with the display face 12 while still allowing a vehicle operator to view the display face 12. Although the preferred vehicular monitoring device 10 is illustrated as a speedometer in FIG. 1, it should be appreciated that other types of vehicular monitoring devices, such as, by way of example only, tachometers, voltage gauges, fuel gauges, temperature gauges, and fluid level gauges, may take advantage of the present invention. Further, the vehicular monitoring device 10 may be used in a plurality of vehicles including, but not limited to, automobiles, trucks, motorcycles, all terrain vehicles ("ATVs"), boats, personal water craft, snowmobiles, recreational vehicles and so forth.

The display face 12 includes an upper show surface and a lower surface. At least a portion of the upper show surface is viewable by the operator of the vehicle and the lower surface may be hidden from view by the casing 14. Various types or styles of casings 14 may be used depending on the specifications of the vehicle that the vehicular monitoring device 10 is being installed in. The transparent cover panel allows the vehicle operator to see the display face 12. The upper show surface may comprise a layer of precious metal, such as gold and/or silver, which has been connected with or deposited on the display face 12.

In some embodiments of the present invention, the entire display face 12 may be manufactured or fabricated from a precious metal, a metal, a metal alloy, a polymer or plastic, or any combination of any of the preceding items. Although the vehicular monitoring device 10 is illustrated as circular in FIG. 1, it should be appreciated that the vehicular monitoring device 10 and the display face 12 may be formed in various shapes and sizes, which will likely vary from vehicle to vehicle.

The vehicular monitoring device 10 may include a sensor scale 16 that is used to communicate or display vehicular condition and/or status indications to the operator of the vehicle. The sensor scale 16 may include a plurality of indicia 18 that is used to describe or illustrate what is being viewed by the operator of the vehicle. The indicia 18 may be comprised of various designs that are used to communicate the status of what is being monitored to the operator of the vehicle. For example, the indicia 18 may be comprised of letters, numbers, hash marks, designs and so forth.

In the embodiment illustrated in FIG. 1, the indicia 18 are set forth in miles-per-hour ("MPH") because in this embodiment, the vehicular monitoring device 10 is a speedometer. It should be appreciated that other indicia 18 may be used in other embodiments of the present invention, which will vary depending upon the exact nature of what is being monitored on the vehicle by the vehicular monitoring device 10. For example, in some embodiments of the present invention, the indicia 18 may indicate fluid temperature, fluid level, oil temperature, revolutions-per-minute ("RPM") and so forth.

Figure 2:
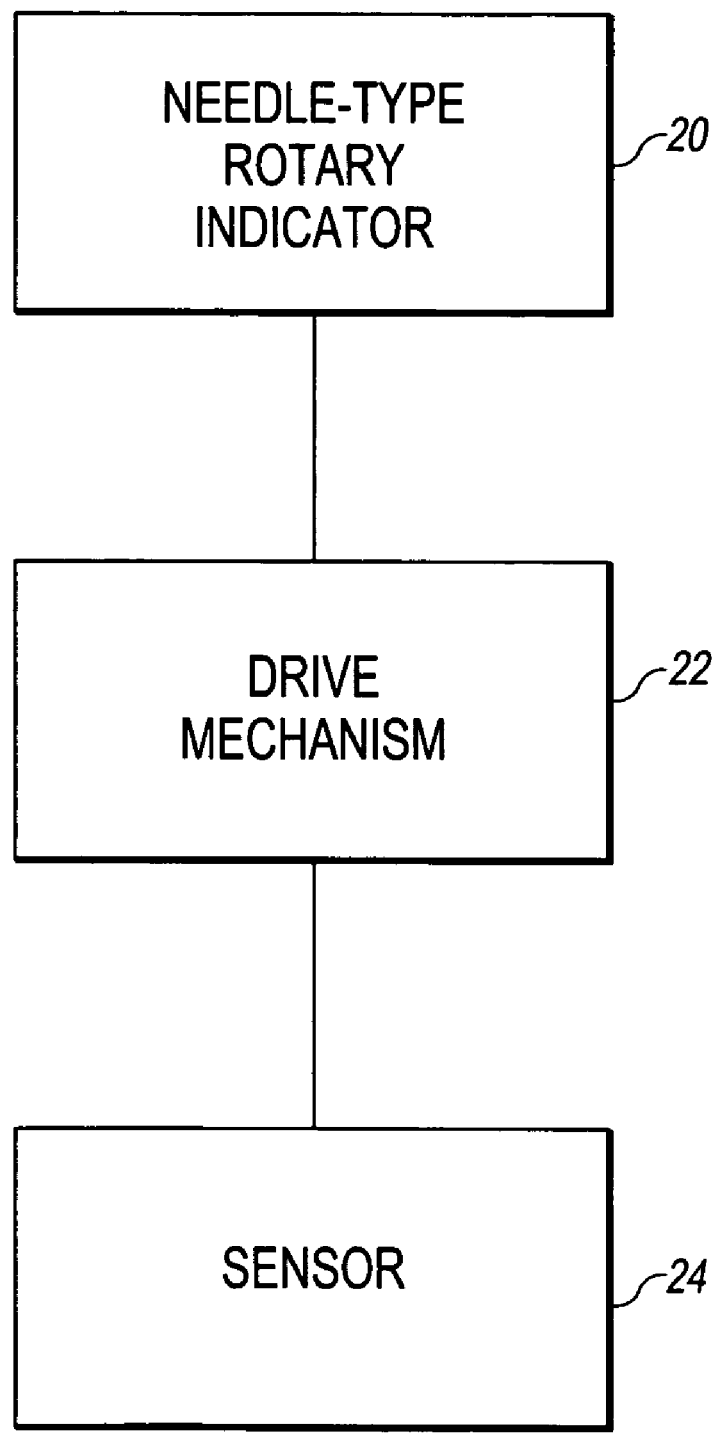
FIG. 2 is a block diagram illustrating representative components of the vehicular monitoring device.

The vehicular monitoring device 10 may also include at least one needle-type rotary indicator 20. The needle-type rotary indicator 20 may be positioned between the display face 12 and the transparent cover panel. Referring to FIG. 2, the needle-type rotary indicator 20 may be connected with a drive mechanism 22. The drive mechanism 22 may be connected with a sensor 24. The drive mechanism 22 is operable to control the needle-type rotary indicator 20 in response to signals generated by the sensor 24.

The signals generated by the sensor 24 are indicative of whatever vehicle condition the sensor 24 is monitoring. The needle-type rotary indicator 20 may be connected with the drive mechanism 22 using any conventional connection method or device. Although not illustrated in FIG. 1, an aperture may be located in the display face 12 to allow the needle-type rotary indicator 20 to be connected with the drive mechanism 22. During operation, the needle-type rotary indicator 20 may be rotated proportionately along the sensor scale 16 of the display face 12 as a function of the signals received from the sensor 24.

By way of example only, if the vehicular monitoring device 10 is used to indicate the speed of the vehicle, the drive mechanism 22 will indicate the speed of the vehicle by placing the needle-type rotary indicator 20 at a position along the sensor scale 16 that corresponds to the speed of the vehicle. If the vehicle is traveling at thirty miles-per-hour, the drive mechanism 22 will cause the needle-type rotary indicator 20 to point at the "30" in the sensor scale 16 of the display face 12. Likewise, in other embodiments of the present invention, the drive mechanism 22 will cause the needle-type rotary indicator 20 to point to the corresponding indicia 18 that indicates the current status of the condition that is being monitored on the vehicle.

The drive mechanism 22 used to control operation of the needle-type rotary indicator 20 may vary from application to application. Some drive mechanisms 22 may be electronically or microprocessor controlled while others may be mechanically controlled. In addition, the type of sensor 24 connected with the vehicular monitoring device 10 may vary from application to application depending on the vehicle's specifications on the condition to be monitored. Some sensors 24 may be designed to monitor tire revolutions, engine revolutions, temperature, voltage, fluid levels and so forth. For the purpose of the present invention, it is important to note that the drive mechanism 22 controls operation of the needle-type rotary indicator 20 as a function of signals sent to the drive mechanism 22 from the sensor 24.

Referring back to FIG. 1, the display face 12 of the vehicular monitoring device 10 may include the sensor scale 16 and a display area 26. The display area 26 may be broadly defined as any area of the display face 12 that is not included in the sensor scale 16. As set forth above, the sensor scale area 16 may include indicia 18 that indicate the status or level of a condition being monitored on the vehicle (e.g.— speed, temperature, fluid level and so forth). The display area 26 may not include areas of the display face 12 where the indicia 18 of the sensor scale 16 are located on the display face 12. As such, it should be appreciated that a portion of the custom graphic design 28 set forth below may be incorporated around the sensor scale 16.

In one preferred embodiment of the present invention, the display area 26 of the vehicular monitoring device 10 includes a predetermined or custom graphic design 28. The custom graphic design 28 may be picked out or custom designed by the operator of the vehicle or any other individual. The custom graphic design 28 may comprise a plurality of gems 30 that are arranged and set in a predefined pattern or design. As illustrated in FIG. 1, the custom graphic design 28 may be in the shape of a flame formed using red rubies and diamonds that are set in the display face 12. It should be appreciated that the custom graphic design 28 may vary from customer to customer as each vehicular monitoring device 10 may be custom designed and built pursuant to the customer's specifications.

As briefly set forth above, the custom graphic design 28 may be created or formed using a plurality of gems 30. The type of gems 30 used may vary from customer to customer and may be chosen from a wide variety of gems 30 including, but not limited to, laboratory created gems, precious gems, semi-precious gems, synthetic gems, and glass. In addition, each custom graphic design 28 may be formed using more than one type of gem 30. Although the custom graphic design 28 is preferentially formed using gems 30, some parts of the custom graphic design 28 may be formed using other types of materials such as different types of paint, plastic, stickers, metal, alloys and so forth.

In one embodiment of the present invention, the gems 30 of the custom graphic design 28 may be connected with the upper show surface of the display face 12. The display face 12 may be manufactured using a precious metal, such as gold or silver for example. Although not specifically illustrated, a plurality of stone settings may be formed in the upper show surface of the display face 12. A setting is a support structure that is formed in something or out of something, typically a type of metal such as gold or silver, which is used to securely mount a gem in a given position or location. The gems 30 may be set in the display face 12 in one of a variety of styles including, but not limited to, a pavé-setting, a bearing setting, a bezel setting, a bead setting, a plate setting, a spun setting, a reverse bezel setting, a prong setting, a channel setting, a semi-bezel setting, an adhesive setting, a finding setting and so forth.

In another embodiment of the present invention, the gems 30 may be set in a layer of precious metal that has been deposited on or connected with an upper surface of the display face 12. Harder metals are not as easy to work with and if the display face 12 is made from a hard metal, a layer of precious metal may be deposited on or connected with the upper surface of the display face 12, which will be used as the show surface. Precious metal is typically softer or more pliable than most metals commonly used in the gauge industry and thus, is easier to form settings in than hard metals. The settings may be formed on the show surface of the display face 12 and the gems 30 may then be set in the settings.

Figure 3:
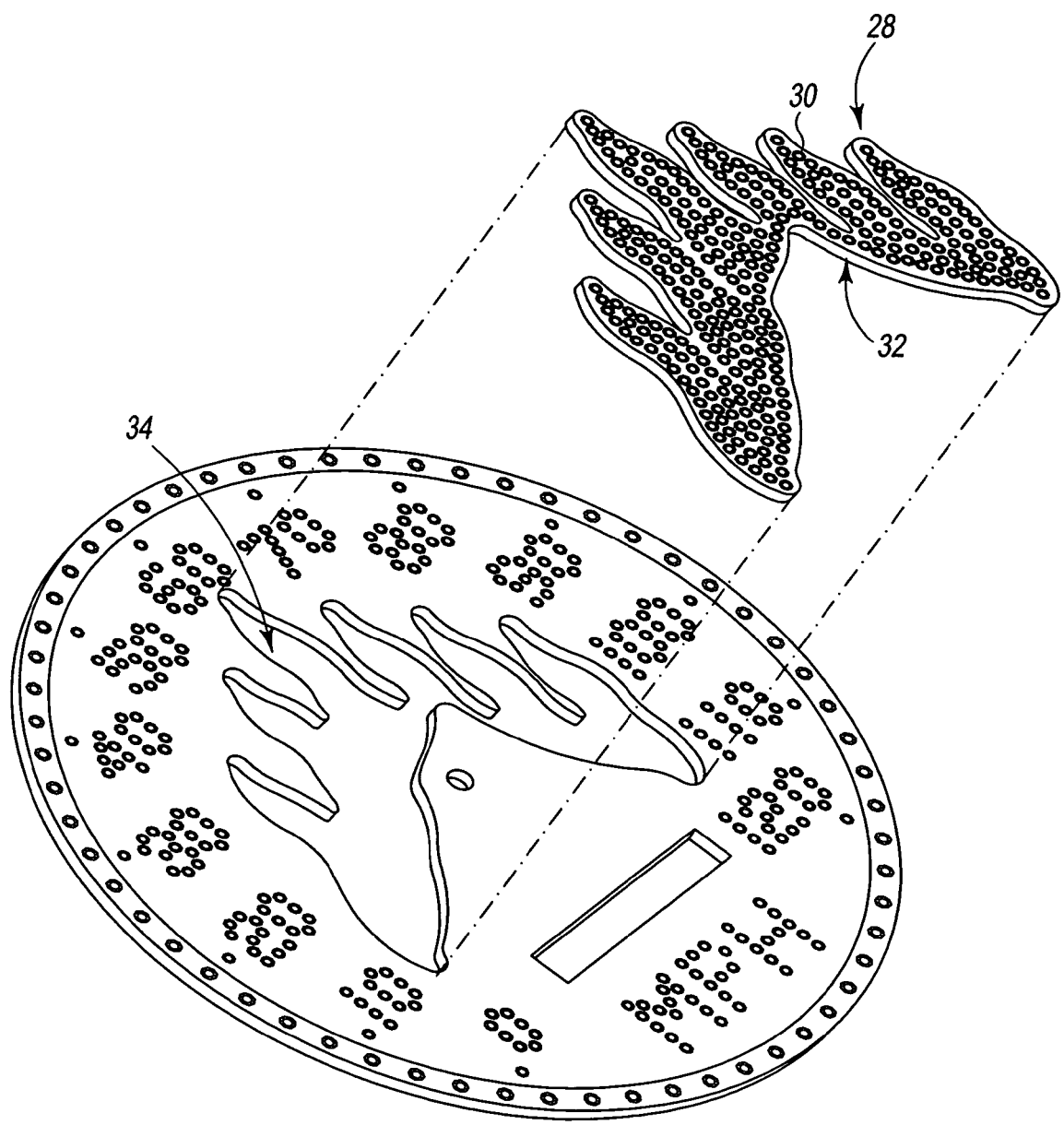
FIG. 3 is a perspective view of a display face with a support structure holding a plurality of gems.

Referring to FIG. 3, in yet another embodiment of the present invention, the gems 30 may be set in at least one support structure 32. In this embodiment, the support structure 32 may be formed having the desired shape or a portion of the desired shape of the custom graphic design 28. The display face 12 may include at least one recess or cut-out 34 in which the support structure 32 is mounted. The recess or cut-out 34 may be shaped like the custom graphic design 28 having enough extra width or tolerance to allow the support structure 32 to fit within the recess or cut-out 34. The support structure 32 may then be secured within the recess or cut-out 34 by one of several connection methods, such as welding, soldering, gluing and so forth. Like other embodiments of the present invention, the gems 30 may be mounted in the support structure 32 using various types of settings that are formed or contained in the support structure 32. The type of setting chosen may vary based on the specific style and size of gem 30 that is being placed within the support structure 32.

Referring back to FIG. 1, the indicia 18 in the sensor scale 16 may also be formed using a plurality of gems that are set in the display face 12 in a predetermined arrangement. The arrangement in which the gems are set in the display face 12 will vary depending upon the nature of the indicia 18. Although not illustrated, as with the embodiment set forth in FIG. 3, the indicia 18 may also be set in a support structure 32 that fits within a recess or cut-out in the display face 12. The indicia 18 may be secured within the recess or cut-out 34 by welding, soldering, gluing and the like.

The needle-type rotary indicator 20 may also include at least one gem 36 that is set on an upper surface of the needle-type rotary indicator 20. The needle-type rotary indicator 20 may include a central portion 38, an indication portion 40 and a lower portion 42. The gems 36 may be set in the central portion 38, the indication portion 40 and the lower portion 42. In some embodiments of the present invention, the number of gems 36 set in the needle-type rotary indicator 20 may vary due to the need that may arise for counterbalancing the weight placed on the indication portion 40 and the lower portion 42. If too much weight is placed on one end, it may cause the needle-type rotary indicator 20 to malfunction or tilt off balance.

As further illustrated in FIG. 1, the casing 14 of the vehicular monitoring device 10 may include an outer rim or bezel portion 44. In some embodiments of the present invention, the outer rim 44 may also include at least one gem 46. The gem 46 may be set in the outer rim 44 using one of several different types of settings. It should be appreciated that in any embodiment of the present invention, the style of gem and the number of gems set within the various components described herein may vary from customer to customer.

Although not illustrated, the sensor scale 16 may include a digital display unit that is positioned within a casing 14. The digital display unit may be positioned within an aperture in the display face 12. In this embodiment, the drive mechanism 22 may comprise an electronic control unit that is connected with the digital display unit and the sensor 24. The electronic control unit is used to control what is displayed on the digital display unit in response to signals received from the sensor 24. The display face 12 may include a display area 26 that includes a custom graphic design 28. As with the previously disclosed embodiments, the custom graphic design 28 may include a plurality of gems 30 that are set in the display face 12 in one of a variety of settings.

Another embodiment of the present invention discloses a method of retrofitting an existing vehicular monitoring device 10. In this embodiment of the present invention, an existing display face may be removed from the casing 14. A new display face 12 may be fabricated having an upper show surface and a lower surface in substantially the same shape as the existing display face. A plurality of gems 30 may be set in the new display face 12 to form a custom graphic design 28. The new display face 12 may then be placed back within the casing 14. As in other embodiments, the sensor scale 16 and the outer lip 44 of the casing 14 may also include at least one gem that is set in a predetermined pattern.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A vehicular monitoring device, comprising:
   a casing;
   a display face positioned within said casing such that an upper show surface of said display face is visible, wherein said upper show surface of said display face includes a display area that has a sensor scale, wherein said display area includes a custom graphic design comprising a plurality of gems set in a predefined pattern to form said custom graphic design;
   a drive mechanism connected with said casing;
   an indicator needle connected with said drive mechanism, wherein said indicator needle protrudes through an aperture in said display face such that said indicator needle is located a predetermined distance above said upper show surface of the display face;
   a vehicular sensor connected with said drive mechanism, wherein said vehicular sensor is operable to generate a control signal that is sent to said drive mechanism, wherein said drive mechanism is operable to move said indicator needle as a function of said control signal generated by said vehicular sensor; and wherein said casing includes a beveled outer lip, wherein said beveled out lip includes a plurality of gems set in a predetermined pattern in said beveled outer lip.

2. The vehicular monitoring device of claim 1, wherein said sensor scale comprises a plurality of indicia, wherein said plurality of indicia comprise a plurality of gems set in a predefined pattern to form said plurality of indicia.

3. The vehicular monitoring device of claim 1, wherein said plurality of gems is set in a support structure, wherein said support structure is set in a recess formed in said display face.

4. The vehicular monitoring device of claim 1, wherein said plurality of gems may be set using a method selected from the group consisting of a pavé-setting, a bearing setting, a bezel setting, a bead setting, a plate setting, a spun setting, a reverse bezel setting, a prong setting, a channel setting, a semi-bezel setting, an adhesive setting, a finding setting.

5. The vehicular monitoring device of claim 1, wherein said plurality of gems is set in a support structure, wherein said support structure is set in an aperture in said display face.

6. A method of retrofitting a vehicular monitoring device, comprising the steps of:
   removing an existing display face from a casing;
   fabricating a new display face having an upper show surface and a lower surface in substantially the same shape as said existing display face;
   setting a plurality of gems in said new display face to form a custom graphic design;
   setting a second plurality of gems around an outer lip of said casing; and
   placing said new display face within said casing.

7. The method of claim 6, further comprising the step of setting a second plurality of gems in said new display face to form a plurality of indicia in a sensor scale.

8. The method of claim 6, wherein said plurality of gems may be set in said display face using a setting selected from the group consisting of a pavé-setting, a bearing setting, a bezel setting, a bead setting, a plate settings, a spun settings, a reverse bezel setting, a prong setting, a channel setting, a semi-bezel setting, an adhesive setting, a finding setting.

* * * * *